United States Patent [19]  
Cohen

[11] 3,765,826  
[45] Oct. 16, 1973

[54] METHOD AND APPARATUS FOR TREATING MATERIALS
[75] Inventor: Sidney M. Cohen, Allentown, Pa.
[73] Assignee: Fuller Company, Catasauqua, Pa.
[22] Filed: Apr. 12, 1972
[21] Appl. No.: 243,487

Related U.S. Application Data
[60] Division of Ser. No. 51,702, July 1, 1970, and a continuation-in-part of Ser. No. 687,867, Dec. 4, 1967, abandoned.

[52] U.S. Cl. ................................................. 432/58
[51] Int. Cl. ............................................ F27b 15/00
[58] Field of Search .............. 263/21 A, 21 B, 32 R, 263/53 R; 432/58

[56] References Cited
UNITED STATES PATENTS
| | | | |
|---|---|---|---|
| 2,529,366 | 11/1950 | Bauer | 263/21 A |
| 3,595,542 | 7/1971 | Ashman | 263/21 A |
| 3,565,408 | 2/1971 | Reh | 263/21 A |
| 3,238,634 | 3/1966 | Goins | 263/21 A |
| 2,027,659 | 1/1936 | Newhouse | 263/32 R |

Primary Examiner—John J. Camby  
Attorney—Jack L. Prather

[57] ABSTRACT

A method, and an apparatus for executing such method, of making sealed surface fine lightweight aggregate particles comprising the steps of pretreating argillaceous rock particles so as to form fine aggregates; maintaining such fine aggregates as a dense fluidized bed in a fluid bed reactor wherein the fines therein are of variable size ranging from 0. mm to about 9.5 mm and have an even distribution of the various sizes within such range; subjecting the dense fluidized bed to a supply of fuel and hot oxygen gas containing fluidizing and combustion gases, such fuel being introduced at least in part directly into the bed; continuously introducing pretreated fine aggregates to the bed; and continuously removing finished lightweight aggregate particles having sealed surfaces from the reactor.

9 Claims, 3 Drawing Figures

METHOD AND APPARATUS FOR TREATING MATERIALS

This is a division of application Ser. No. 51,702, filed July 1, 1970, and also a continuation-in-part of Ser. No. 687,867, filed Dec. 4, 1967, now abandoned.

BACKGROUND OF THE INVENTION

The field of the present invention pertains to an apparatus and process for heating and expanding argillaceous rock materials so as to form sealed surfaced lightweight aggregate, especially aggregate ranging in size from 0. mm to 9.5 mm and referred to as fines and superfines lightweight aggregates.

The present invention deals with those lightweight aggregates which can be manufactured from clays, shales, and slates. The physical properties of lightweight aggregates of the present invention are such that the outer core of each aggregate is sealed, that is to say it has a very fine pored outer surface. The interior of each aggregate is extremely porous. The interior porosity is obtained during the present process by the formation of a pyroplastic state which occurs during expansion of the raw material due to gas forming components contained therewithin.

The two requirements for expansion are, 1) the material must have a chemical composition such that in a certain narrow temperature range a pyroplastic surface condition is produced having a high viscosity, and 2) that in this same approximate temperature range the gas forming components release the bloating gas.

These gas forming components may be naturally occurring, or they may be the result of introducing into each particle a bloating agent. The addition of a satisfactory bloating agent to the raw materials forms a part of this invention and will be explained more fully hereinafter.

Three processes are known in the prior art for manufacturing fine lightweight aggregate. One process involves the use of a sintering machine; another process involves the use of a rotary kiln. A third process involves the use of apparatus such as that shown in U. S. Pat. No. 3,118,658 issued to H. Dennert.

With the sintering machine, the fine lightweight aggregates are produced by crushing the coarse expanded cake emanating from a sintering machine. The problem with this technique is that the crushing step opens a large number of voids or pores in the material. The surface exposed voids result in the fine aggregates having increased and irregular water absorption characteristics which make their use in the manufacture of concrete block and lightweight concrete highly disadvantageous and in some cases commercially unacceptable.

Most rotary kiln operations apply a similar system as the sintering operation where relatively coarse lightweight aggregate is crushed to produce fines which causes exposed pores as stated above.

A few of the rotary kiln operations have attempted to produce lightweight aggregate fines by means of burning the fine feed material directly in the kiln. However, difficulty with balls and ring formations in the hot zone of the kiln and an excessive loss of unprocessed fines have limited this approach.

Also, it has been found that the finished lightweight fines are relatively heavy as compared to the present invention due to the inherently slow heat up of material in a rotary kiln. For example, a substantial amount of bloating gases are lost in a rotary kiln during the time it takes to pass the material through the nonbloating temperature range of 1500°F to 1000°F. By the present invention, the material is immediately subjected to bloating temperature thus utilizing all bloating gases within the material.

The method of manufacturing lightweight aggregate disclosed in U. S. Pat. No. 3,118,658 includes feeding closely sized particles into a vessel where they are suspended by a strong current of gas and at the same time expanded by the application of heat. As the particles expand, their density decreases, and when a particular density is reached, the particles are automatically blown out of the vessel through the off-gas duct by the gas which suspends the particles in the vessel. The process disclosed in the above mentioned patent has the disadvantage that the particles treated must be closely sized in order for it to be a continuous process.

If the particles fed into the reaction vessel are sized in the wide range contemplated by the present invention, the process disclosed in the above mentioned patent must be done on a batch basis, i.e., the reaction vessel is supplied with material, the material is expanded and the vessel is purged of all material. The continuous process disclosed by U. S. Pat. No. 3,118,658 cannot operate with particles of the range of sizes contemplated by the present invention because the gas velocity necessary to blow the treated large particles out of the vessel would blow the small particles out before they were expanded. If a lower gas velocity were used, only the smaller particles would be blown out and the larger particles would collect in the vessel and either fall through the bottom of the vessel or collect to such an extent that the process would have to be shut down to clean out the vessel.

SUMMARY

The present invention overcomes the objections of the prior systems, and 1.) provides fine sealed aggregates having an acceptable maximum water absorption ranging from 6 to 9 percent, 2.) processes all the raw feed including the dust which is itself a useful product and 3.) eliminates the ball and ring formation problem.

The physical plant or apparatus, and accordingly the method also, of the present invention is of a two-stage nature. The first state relates to pretreating of the fines. The method for pretreating varies widely according to the physical and chemical characteristics of the various aggregate particles as stated above which may be used for production of lightweight aggregate. The stages are described fully below; however, in general the pretreating stage may involve crushing, sizing, adding a bloating agent, pelletizing or extruding and crushing, feeding the prepared raw material to a preheater and bringing the argillaceous particles up to a first temperature of about 600°F for a period of time necessary to substantially reduce the tendency of the particles to decrepitate due to thermal shock. The second stage or main treating stage involves maintaining the pretreated argillaceous particles as a dense fluidized bed, subjecting the dense bed to a supply of fuel and hot oxygen gas containing fluidizing and combustion gases, maintaining the dense bed at a substantially constant predetermined temperature within a range of about 1900°F to 2200°F and discharging the finished product from the reactor. The discharged product is then cooled.

It is a principal object of the present invention to overcome the disadvantages of the prior known systems for the manufacture of lightweight aggregate fines.

A further object of the present invention is to provide a system where full use of the bloating gases within a raw material, or added to a raw material before pelletizing, will be utilized thus producing the lightest possible fine aggregate.

A further object of the present invention is to provide an apparatus and method for the continuous manufacture of lightweight aggregate of a fine size ranging from approximately 0. mm to 9.5 mm in size.

A further object of the present invention is to provide for various means of pretreating the argillaceous raw materials, each pretreating means varying in accordance with the particular physical characteristics of the raw feed material.

A further object of the present invention is to provide for the pretreating of superfine argillaceous raw materials in a range of approximately 0.0 mm to 2.0 mm wherein a bloating agent is added to the raw material prior to introduction in a pelletizer or extruder so as to provide for adequate expansion of the aggregates.

A further object of the present invention is to provide a method for obtaining fine lightweight aggregate which has a completely sealed surface obtained by producing combustion over the entire surface of the particles as they are fluidized.

A further object of the present invention is to feed at least part of the combustion fuel directly to the bed and to utilize a grid plate placed above the combustion chamber so as to allow a uniform suspension of a sized range of particles within 0.0 to 9.5 mm and uniform combustion over the entire surface of the fluidized particles.

A further object is to provide the unique combination of a rotary kiln pretreater supplying pretreated feed material to a fluid bed reactor and including the feature of the fluid bed reactor off gases supplying all or at least a portion of the combustion gases required for the pretreating operation in the rotary kiln.

BRIEF DESCRIPTION OF THE DRAWINGS

Further object, features and advantages will become more apparent upon consideration of the following detailed description.

DESCRIPTION OF THE PREFERRED EMBODIMENT

Figure 1:
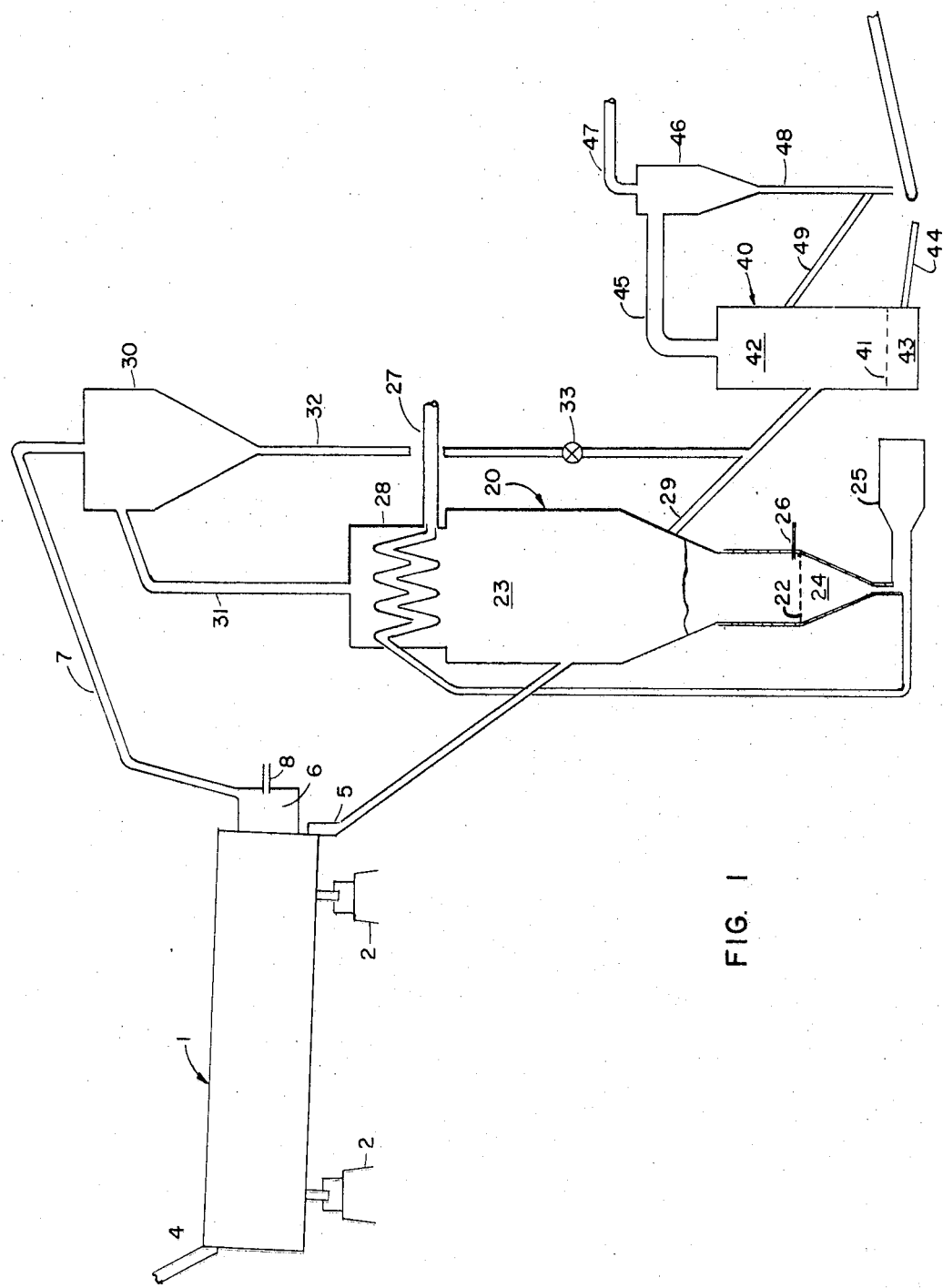
FIG. 1 is a generally schematic elevational view partly in section of the present invention and showing one type of pretreatment unit, namely, a rotary kiln.

As shown in FIG. 1, a rotary kiln 1 is supported in a slight declining position for rotary movement by means of suitable conventional supports 2 and powered by suitable conventional means (not shown). The kiln includes a material inlet 4 at one end and an outlet 5 at the discharge end. If desired, the inlet 4 may be provided with a material regulating valve (not shown) for controlling the amount of material supplied to the kiln 1. At the discharge end there is provided a burner housing 6 which is supplied with two separate sources of heat energy to process or pretreat the raw feed material. The one source of heat energy comes from off gases in the fluid bed reactor to be described below through conduit 7. The second source of heat energy is supplied by means of an auxiliary burner 8. Control of the two sources of heat energy can be executed by either manual or automatic means.

The material outlet conduit 5 is arranged to remove pretreated material by gravity from the pretreater 1, and convey it to the fluidized bed reactor 20 at a feed inlet port preferably located at a point above the expected fluidized bed level. The fluidized bed reactor 20 includes a perforated grid 22 which extends across the reactor and thereby divides it into a reactor chamber 23, arranged above the grid 22, and a gas chamber 24 situated below the grid 22.

The lower end of the gas chamber 24 is in communication with an auxiliary or start-up combustion burner 25 to which both air and fuel are fed by means of suitable valved inlet means (not shown).

The main source of fuel is supplied through feed line 26 which supplies fuel to the bed at a point above the grid thereby producing combustion within the bed and at the surface of each aggregate particle.

A main air supply line 27 also carries a branch line which passes through a heat exchanger 28 above the reactor chamber 23 and down to the chamber 24.

The processed material, excluding dust which is carried off by the hot gases, is discharged through overflow conduit 29 into a cooler unit to be described later. If desired, two or more spaced apart overflow conduits may be provided as shown by U. S. Pat. No. 3,361,539 issued to R. Pyzel. The use of more than one overflow conduit provides a control over the depth of the fluidized bed.

A cyclone separator 30 communicates with the reactor chamber 23 through conduit 31. Cleaned, hot off gases are discharged to conduit 7 for pretreating raw feed material in kiln. The separated solid material, or processed dust, is discharged through the cyclone separator outlet 32 which may be supplied with a rotary valve means 33 to control the solid material flow to overflow conduit 29.

The cooler unit 40, having structural characteristics closely similar to that of fluidizing bed reactor 20, has a grid 41 which divides the cooler unit into an upper chamber portion 42 and a lower chamber portion 43. A fluidizing medium is supplied to the lower chamber 43 through conduit 44 from a suitable source such as a blower (not shown) to fluidize the material supported above the grid 41 and within the upper chamber 42. The cooled product is discharged through outlet overflow conduit 49. The cooled off gases and dust carried therewith are discharged from the upper chamber 42, through conduit 45, to a second cyclone separator 46 where the separated gas is routed through gas discharge outlet 47 to a dust collector (not shown). The separated solid material is discharged through pipe 48 to join the cooler product from conduit 49.

Figure 2:
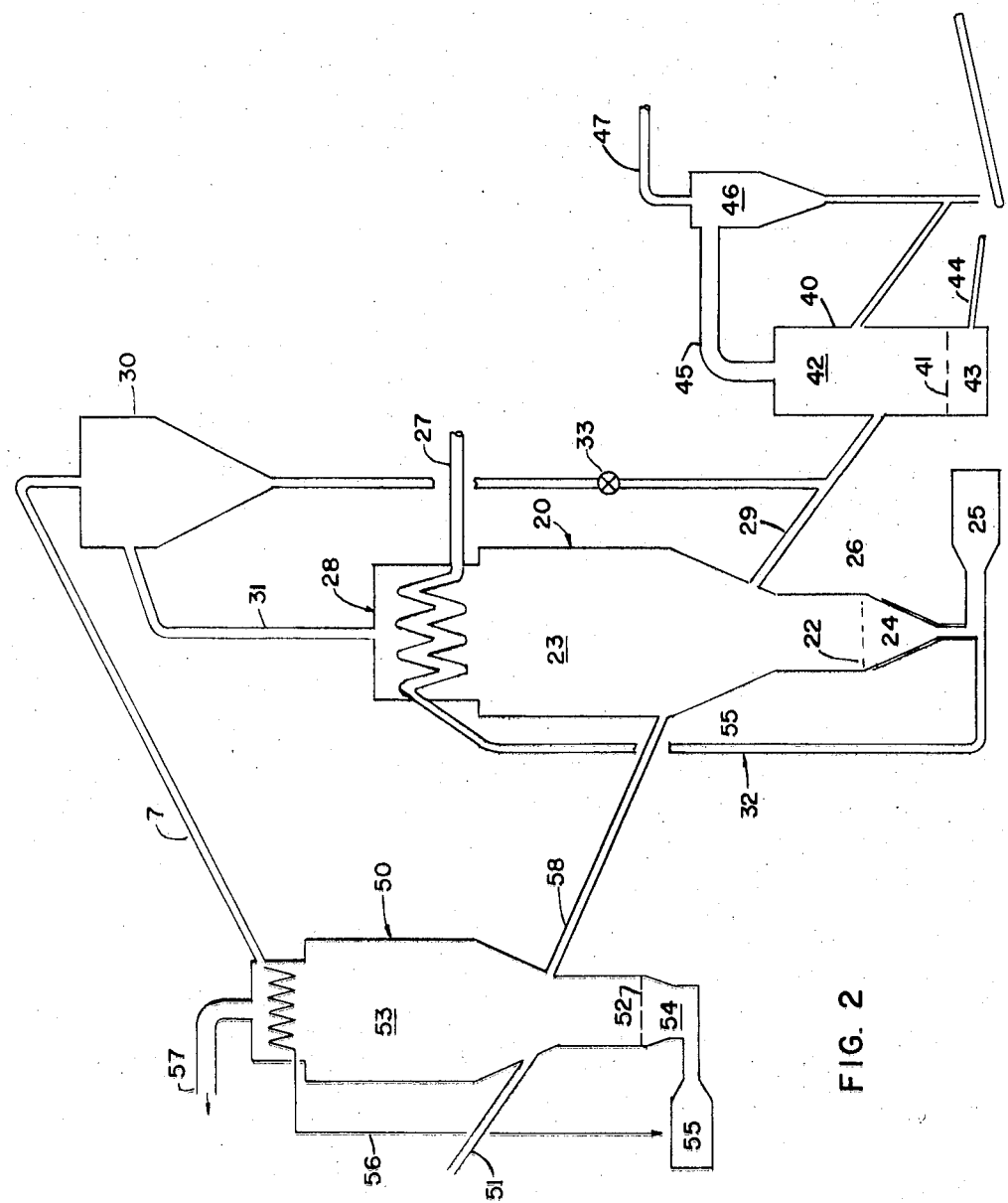
FIG. 2 is a generally schematic elevational view partly in section showing an alternative method of pretreating, namely, by means of a fluidized bed reactor.

An alternative apparatus for carrying out the same general process is shown in FIG. 2 wherein the pretreating unit constitutes a fluidized bed reactor 50. A feed inlet 51 is located near the upper end of the pretreater 50. The inlet may be provided with a regulating valve (not shown). A grid 52 extends across the pretreater below the feed inlet 51 and thereby divides the pretreater into an upper chamber 53 and a lower chamber 54.

The lower chamber 54 is in the form of an inverted conical structure having its lower end in communication with an auxiliary or start-up combustion burner 55 to which fuel and air may be added from a suitable source (not shown) for providing the fluidizing medium for any material present within the upper chamber 53. A second source of heat energy for pretreater 50 is provided by means of the hot off gases from the main fluid bed reactor 20 which, after being cleaned in separator 30 pass through conduit 7, heat exchanger 54 (similar in construction to heat exchanger 28 of reactor 20 as shown in FIG. 1) and thence line 56 to burner 55 and ultimately chamber 53. The two separate sources of heat energy may be controlled and proportioned by either manual or automatic means (not shown) to provide whatever heat is needed in the bed depending on the properties of the feed material. Off gases from pretreater 50 are vented through line 57 to a suitable dust collector (not shown).

At a point below the material inlet 4 to the pretreater 50, a material overflow conduit 58 is arranged that removes pretreated material by gravity from the pretreater, and conveys it to the fluidized bed reactor 20 at the feed inlet port provided. The rest of the system is similar to that described in FIG. 1.

The complete method for producing fine lightweight aggregate according to the present invention involves various steps in preparing the material for feed to the pretreater. Also, in those cases where the raw feed material does not possess properties which would cause it to decrepitate due to thermal shock, the pretreatment step may be eliminated. However, for the sake of clarity and convenience the method of processing the material using the equipment shown in FIGS. 1 and 2 will be explained first. The variations in method therefrom can more easily be understood if described thereafter. It will also be noted that while the process methods are described in conjunction with the apparatus of FIGS. 1 and 2, a multistage fluid bed reactor may be utilized despite some disadvantages.

Regardless of the pretreatment process used, it has been found advantageous and, in fact in order to obtain optimum results and efficiency to pelletize and screen the raw feed material so as to obtain a size range distribution which may be considered somewhat similar to the Gausian or Normal distribution curve. For example, the following distribution of size ranges has been found to be satisfactory:

| Mesh Size | Percentage (by weight) |
| --- | --- |
| 4 | 5 |
| 6 | 10 |
| 8 | 20 |
| 10 | 30 |
| 14 | 20 |
| 20 | 10 |
| 28 | 5 |

It should be understood that the screening operation does not involve a multistep process to achieve an exact normal distribution curve. The screening operation is simply a removal of large particles, e.g., larger than 9.5 mm, and, if desired, a removal of the very fine particles. The remaining particles range in size from substantially 0 mm to approximately 9.5 mm in approximate accordance with a normal distribution curve. It should also be understood that the size ranges illustrated above are not intended to be a limiting factor. The process and apparatus of the present invention are capable of treating raw material ranging from 2 mesh down to as fine as 450 mesh.

To initiate the process using the system shown in FIG. 1, the reactor 20 is fired by means of start-up burner 25. At the same approximate time raw material is fed through inlet 4 and gradually makes its way to outlet 5 spilling into reactor chamber 23 to form an initial bed of material for fluidization. Combustion air from sources 25 and 27 fluidize the material and form a fluid bed having a depth equal to the distance between the grid 22 and the conduit 29. An area above the bed is formed which is substantially free of particulate matter. Also, heated off gases from the reactor 20 pass through separator 30 and conduit 7 to partially dry the initial bed material of kiln 1. Once a sufficient amount of material has been fed through inlet 4 to obtain the initial bed of material, the inlet 4 is closed. The starting bed temperature is then brought up to the ignition point of the fuel to be used at fuel inlet 26 by the combustion burner 25. Fuel is then fed direct to the fluidized bed of material in chamber 23 by means of fuel inlet 26 and combustion burner 25 is shut off. At this point the temperature in the reactor 20 is approximately 800°F – 1400°F in accordance with the ignition temperature of the fuel being supplied. Temperatures are then increased to 100°F below the processing temperature by means of fuel injection at burner 26. Feed inlet 4 is then opened to supply a continuous flow of material to the kiln. At the same time auxiliary burner 8 is fired to bring the kiln temperature to 600°– 1400°F depending on the pretreat temperature necessary to dry and pretreat material so as to process it sufficiently to overcome its tendency to decrepitate due to thermal shock when fed to reactor 20. Before the pretreated material spills from kiln to reactor, the reactor is then brought to the operating temperature, approximately 1900°– 2200°F, which is again dependent upon the material being processed. If the off gases from separator 30 are at this time of sufficient temperature alone to pretreat the material in kiln 1, the auxiliary burner 8 may be shut off.

Once the fluidizing reactor 20 is in operation, pretreated argillaceous material passing from the pretreater 1, is continuously fed directly into the fluidizing bed formed above the grid 22 in the fluidizing reactor 20 as a dense fluid bed of aggregates. Further, not only is a supply of fuel fed directly to the dense bed, but the bed is maintained at a constant temperature by the circulation within the bed, and it is maintained at a constant volume within the reactor chamber 23 by the overflow through off-take conduit 29.

After the aggregates, forming the dense fluidized bed, are adjusted to the desired degree of expansion of bulk density they spill out through the overflow conduit 29 of the fluidizing reactor unit 20 and are passed to the cooler unit 40, where the expanded lightweight sand aggregates are again subjected to the action of fluidization—this time by the action of cooled gases passing up through the grid 41 from the lower chamber 43.

When the product is sufficiently cooled to the desired temperature, which is 150° – 300°F, it in turn spills through the overflow conduit 49 of the cooler unit 40 for final use as totally sealed fine lightweight aggregates. Further, any gases passing up through the fluidizing bed, within the cooler unit 40, pass through conduit 45 to a separator 46 where the solid material is separated and passed through conduit 48 for use as product, while the separated gases are passed for treatment through conduit 47.

It is to be understood that, if any solid aggregates are carried by the upwardly moving gases through the fluidizing reactor unit 20, they are passed directly into the rotary kiln pretreater 1.

If the heated gases, recycled from the fluidizing reactor 20, do not bring the temperature of the pretreating kiln 1 to the desired temperature range of between 600°F and 1400°F, additional heat may be added by the auxiliary burner 8, as explained above.

The method of operating and processing the raw materials using the system as shown in FIG. 2 which includes a fluidized bed pretreater is substantially the same as that described above in connection with the system shown in FIG. 1 which includes the rotary kiln pretreater. The operating temperatures and the period of time in which the raw materials are held in such temperatures will be substantially the same for any given raw material.

Although the process has been described as though the pretreating and formation of sealed lightweight aggregate is one continuous operation, it should be understood that this is not necessary. In many cases, the pretreating process employing the rotary kiln 1 and associated apparatus of FIG. 1 or the fluidized bed reactor 50 and associated equipment of FIG. 2 may not be necessary. The pretreatment is necessary only where the physical characteristics of the raw material are such that suddenly subjecting the material to the high temperatures of the reactor 20 would cause the material to decrepitate due to thermal shock. In those instances where the physical properties of the material permit it, the raw material may be fed directly into the reactor 20 eliminating the expensive pretreatment apparatus. In other cases, it may be desirable to pretreat the materials and put them in storage for later processing in the fluidized bed reactor and cooler unit.

With the present invention, fine lightweight aggregate may be produced more readily than with prior techniques. The rotary kiln has not proved satisfactory for the production of fine sealed lightweight aggregate. The process and apparatus such as that disclosed in U.S. Pat. No. 3,118,658 is not satisfactory because its use is primarily limited to a close graded raw material; e.g. up to 10 mesh, 10 to 20 mesh, 20 to 30 mesh, etc. If a range of particle sizes are to be treated, it must be done on a batch basis rather than on a continuous basis. The inefficiencies of a batch operation are well known.

The process and apparatus of the present invention has the further advantage that the retention time in the fluidized bed reactor can be controlled by either controlling the rate at which raw material is supplied to the reactor or by controlling the fluid bed depth. This is done by providing more than one point of discharge for product such as discharge 29. This permits a measure of control over the finished product.

EXAMPLE

The following is an example of a test program which shows the advantage of making a lighter product according to the method and with the apparatus of the present invention over the method of direct burning of fines in a rotary kiln using the same shale feed material with both methods:

CHEMICAL ANALYSIS OF RAW SHALE

| Dry Basis | (Percent by weight) |
|---|---|
| $SiO_2$ | 67.84 |
| $Al_2O_3$ | 13.77 |
| $Fe_2O_3$ | 4.19 |
| CaO | 1.64 |
| MgO | 2.35 |
| $K_2O$ | 2.52 |
| $Na_2O$ | 0.80 |
| Loss | 5.18 |
| Total | 98.29 |
| $CO_2$ | 1.85 |
| $SO_3$ | 0.57 |

SCREEN SIZING OF SHALE FEED

| Mesh Size | (Weight %) Retained Individual | Cumulative | Passing Cumulative |
|---|---|---|---|
| + 4 | 0.7 | 0.7 | 99.3 |
| −4 + 6 | 8.5 | 9.2 | 90.8 |
| −6 + 8 | 13.5 | 22.7 | 77.3 |
| −8 +10 | 23.5 | 46.2 | 53.8 |
| −10 +14 | 18.1 | 64.3 | 35.7 |
| −14 +20 | 17.0 | 81.3 | 18.7 |
| −20 +28 | 12.0 | 99.3 | 6.7 |
| −20 | 6.7 | | |
| Total: | 100.0 | | |

TEST RESULTS

The products produced from the above feed in similarly sized rotary kiln and fluid bed pilot equipment had bulk density of 59.0 lbs./cu.ft. and 50.0 lbs./cu.ft. respectively. A breakdown of the product size fractions and their bulk densities are compared as follows:

| Mesh size | Fluid bed, temperature 2070° F, bulk den. 50.5 lbs/cu. ft., weight percent | | | | Rotary kiln,* temperature 2100° F, bulk den. 59.0 lbs/cu. ft., weight percent | | | |
|---|---|---|---|---|---|---|---|---|
| | Retained Ind. | Cum. | Passing cum. | Bulk den. (#/ft.³) | Retained Ind. | Cum. | Passing cum. | Bulk den. (#/ft.³) |
| +¼" | 0.4 | 0.4 | 99.6 | } 48.1 | { 1.8 | 1.8 | 98.2 } | 55.1 |
| −¼+4 M | 3.2 | 3.6 | 96.4 | | { 13.7 | 15.5 | 84.5 } | |
| −4+6 | 17.3 | 20.9 | 79.1 | | | | | |
| −6+8 | 18.4 | 39.3 | 60.7 | 52.9 | 14.3 | 29.8 | 70.2 | 56.0 |
| −8+10 | 20.9 | 60.2 | 39.8 | 53.9 | 15.5 | 45.3 | 54.7 | 55.6 |
| −10+14 | 15.1 | 75.3 | 24.7 | 55.6 | 13.5 | 58.9 | 41.1 | 58.2 |
| −14+20 | 12.7 | 88.0 | 12.0 | 56.6 | 20.0 | 70.9 | 29.1 | 59.5 |
| −20+28 | 8.8 | 96.8 | 3.2 | 57.2 | 9.9 | 80.8 | 19.2 | 61.3 |
| −28 | 3.2 | | | | 19.2 | | | 67.9 |
| Total | 100.0 | | | | 100.0 | | | |

*This product made at balling conditions.

Figure 3:
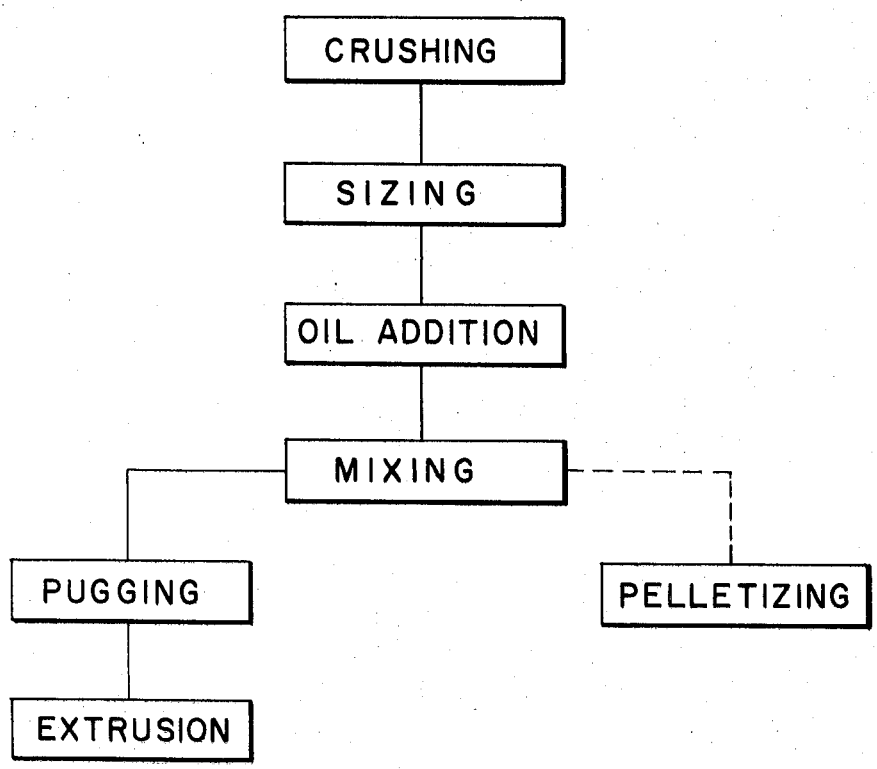
FIG. 3 shows a schematic presentation of a method of preparing very fine sized argillaceous raw materials prior to pretreating by means of a pelletizer.

In FIG. 3 there is shown a schematic pretreating flow diagram showing a process which has been found to be advantageous in the event that very fine graded lightweight aggregate is to be prepared from plant dust and other raw feed preparation material. Such a process has been found particularly advantageous when using raw materials which by themselves as they occur in nature do not have sufficient amount of a bloating agent in their physical characteristics to produce the desired amount of bloating necessary for the production of lightweight aggregate. The raw material, such as quarried shales and clays and recovered plant dusts, may be first passed through a crusher if necessary and then sized by any suitable sizing means.

After crushing and sizing the raw material is chemically treated. It has been found necessary in some raw materials to add certain amounts of a bloating agent. Various bloating agents have been added in the past such as carbon, oil, etc. The present invention includes a particularly advantageous treatment involving the addition of Bunker C oil to the raw material which will be explained below. After chemical treatment the material is mixed and then either pelletized or passed to a pug mill to be prepared for the later step of extruding.

The amount of oil added as a bloating agent is controlled between the range of 0 to 2 percent by weight depending on the desired unit weight of the product and the intended use of the product. It has been determined that when oil additions in excess of 2 percent are used, a large film of oil appears on the outer surface of the resulting extruded pellet which tend to cause reducing conditions on the outer surface, thereby lowering the melting point of the surface with that of the interior and causing a critical sticking problem at the bloating temperature. It also has been determined that the amount of oil added greatly effects the final product's water absorption properties. The higher the percentage of oil used, the greater the final water absorption. By limiting oil additions to less than 2 percent, there is a better chance of keeping the product's water absorption below the accepted 12 percent. A prescribed amount of water may be added to the extruder to aid in the extrusion process. The water may be added at the half-way point of a pug mill section. The amount of water required may be determined by the extrusion properties of the raw materials and controlled by a pressure sensing device in the material flow of the pug section to the extruder. Extruded pellets sized ¾ inch diameter are dried and crushed to the size required for good fluidization. The crushed extruded pellets are fed directly to the pretreating means of either FIGS. 1 or 2 namely the rotary kiln pretreater or the fluid bed reactor pretreater. During the fluid bed burning process, the oil added to the pellet feed acts as a bloating agent. The heat value of the oil also aids in the heat up process of the material by applying heat directly into the pellets instead of applying the heat by way of the burner which is less efficient as far as heat recovery is concerned. The oil additives tend to produce carbon within the particle as it enters the reactor. The iron compound reaction 2 $Fe_2O_3$ 4FeO+$O_2$ releases the oxygen that combines with the C from the oil and CO and $CO_2$ results as the expansion gas within the material which reaches a pyroplastic state at the same time as the above reaction. The pyroplastic state is triggered by the iron reaction. The iron reaction normally occurs at 2000 to 2100°F under oxidizing conditions. The reaction will take place between 1800°F and 2000°F under reducing conditions. Since the oil addition produces a reducing condition within the particle, the processing temperature is greatly reduced. Material which was found to bloat at temperatures around 2100°F without the oil addition will be found to bloat to the same degree at a temperature up to 150°F lower when the oil addition is made. The chance of fusion within the reactor is less because of the lower processing temperature due to the oil additive.

The oil addition will control the product unit weight normally between 45 lb/cu.ft. and 60 lb/cu.ft. by the amount of oil added or by the temperature at which the material is bloated if the oil is added at a maximum amount of 2 percent.

This process, when applied to a raw material that contains limestone or calcite pieces, requires the crushing step to be finer than the —⅛ inch indicated above. A —65 mesh material will insure even mixing of the interfering limestone or calcite to insure good contact with the silica present in the pellets. This combination forms silicates as found in the cement industry instead of free lime which is critical in lightweight aggregate industry.

Certain materials are laminated as they come from the quarry. These laminations cause the materials to separate when bloated and this in turn causes the problem of too high a degree of water absorption. These problems can be overcome by crushing below the point at which laminations are critical and then recombining the material into a nonlaminated pretreatment feed material which will not laminate upon bloating.

Also, as an alternative to the method shown in FIG. 3 and described above, in certain instances superfine dust particles which range generally in size up to 2.0 mm can be pretreated by merely pelletizing and sizing, providing they include a sufficient amount of naturally occurring bloating gases.

As this invention may be embodied in several forms without departing from the spirit thereof, the present embodiment is intended to be illustrative and not restrictive, and the scope of the invention is considered defined by the lawful scope of the appended claims rather than by the description preceding them.

I claim:

1. Apparatus for manufacturing fine lightweight aggregate and the like having a particle size range up to about 9.5 mm comprising in combination a fluidized bed reactor including a perforated grid dividing said reactor into an upper chamber wherein the particles are maintained as a fluidized mass and a lower chamber; means for supplying gas to said lower chamber for passage through the grid to fluidize the particles; menas for heating said fluidized mass to a predetermined temperature range sufficient to cause a pyroplastic condition in the particles of the fluidized mass; means for controlling the length of time said particles are retained in said reactor; means for discharging particles from the reactor; means for discharging off gases from the reactor; and means for cooling the discharged particles; said means for heating said fluidized mass including means for supplying fuel directly to said fluidized mass.

2. The apparatus of claim 1 wherein said means for discharging particles from said reactor is located in the side of said reactor and controls the depth of said fluidized bed.

3. Apparatus adapted for the manufacture of fine lightweight aggregate and the like having a particle size range up to about 9.5 mm and a substantially uniform size range distribuiton comprising in combination, a pretreater for subjecting said aggregate to a temperature of 600°F to 1400°F, said pretreater having an inlet end and an outlet end, a fluidized bed reactor adapted to receive said pretreated aggregate for fluidizing and firing said aggregate at an approximate temperature range of 1900°F – 2200°F, and means to convey said aggregate from said pretreater to said fluidized bed reactor.

4. The apparatus of claim 3 wherein, said pretreater is a rotary kiln, said rotary kiln including support means for supporting said kiln at a slightly declining angle declining in the direction of said pretreater outlet end.

5. The apparatus of claim 4 wherein, said rotary kiln includes combustion means located at said outlet and, said combustion means including an auxiliary burner and means for providing an independent source of hot gases to said kiln, said fluidized bed reactor including an upper chamber, gas separator means adapted to receive hot gases from said upper chamber, said means for providing an independent source of hot gases to said kiln including said gas separator means, and means for controlling and coordinating the amount of heat received by said kiln from said combustion means and from said means for providing an independent source of hot gases to said rotary kiln.

6. The apparatus of claim 3 wherein, said fluidized bed reactor includes a perforated grid means dividing said reactor into an upper chamber wherein the aggregates are maintained as a fluidized mass and a lower chamber, combustion air inlet means provided in said lower chamber, and combustion fuel inlet means provided in said upper chamber in the region of the fluidized mass of aggregates for injecting at least a portion of the fuel required directly into the fluidized mass of aggregates, said combustion air inlet means providing sufficient air for combustion at a pressure sufficient to cause fluidization of said aggregates at a predetermined level, and reactor outlet means for allowing the processed aggregate to be drawn off from the uppermost region of the fluidized mass of aggregates.

7. The apparatus of claim 6 wherein, said reactor includes heat exchanger means located in said upper chamber, said combustion air means including means to convey combustion air through said heat exchanger means to increase the temperature thereof, and gas separator means provided within the region of said upper chamber for conveying hot gases from said upper chamber to said pretreater.

8. The apparatus of claim 6 wherein, said pretreater is an additional fluidized bed reactor including a perforated grid means dividing said reactor into an upper chamber and a lower chamber, a heat exchanger in the region of said pretreater upper chamber and a burner means for providing hot gases to said reactor lower chamber, said burner means including means extending from said gas separator means and through said heat exchanger means.

9. Apparatus adapted for treatment of raw materials and the like comprising, pretreating means for subjecting said raw materials to a first temperature range, said pretreating means including a rotary kiln having an inlet end and an outlet end, combustion means located at said outlet end, said combustion means including an auxiliary burner and means for providing an independent source of hot gases to said kiln, said kiln supported at a slightly declining angle declining in the direction of said outlet end, a fluidized bed reactor adapted to receive the material from said rotary kiln, said reactor including an upper chamber, gas separator means adapted to receive hot gases from said upper chamber, said means for providing an independent source of hot gases to said kiln including said gas separator means, and means for controlling and coordinating the amount of heat received by said kiln from said combustion means and from said means for providing an independent source of hot gases to said rotary kiln.

* * * * *

UNITED STATES PATENT OFFICE
CERTIFICATE OF CORRECTION

Patent No. 3,765,826　　　　　　　　Dated Oct. 16, 1973

Inventor(s)　　Sidney M. Cohen

It is certified that error appears in the above-identified patent and that said Letters Patent are hereby corrected as shown below:

Column 10, line 54, for "menas" read --means--.

Column 11, line 18, for "and" read --end--.

Signed and sealed this 12th day of March 1974.

(SEAL)
Attest:

EDWARD M. FLETCHER, JR.　　　　　C. MARSHALL DANN
Attesting Officer　　　　　　　　Commissioner of Patents